United States Patent [19]

Chatterjee et al.

[11] Patent Number: 5,634,046
[45] Date of Patent: May 27, 1997

[54] GENERAL PURPOSE USE OF A STACK POINTER REGISTER

[75] Inventors: Amit Chatterjee, Redmond; Stuart R. Patrick, Issaquah; Ralph A. Lipe, Woodinville; David N. Weise; Raymond E. Endres, both of Kirkland, all of Wash.

[73] Assignee: Microsoft Corporation, Redmond, Wash.

[21] Appl. No.: 316,632

[22] Filed: Sep. 30, 1994

[51] Int. Cl.$^6$ .................................................. G06F 9/06
[52] U.S. Cl. .................................... 395/568; 395/378
[58] Field of Search ................................ 395/700, 375

[56] References Cited

U.S. PATENT DOCUMENTS

| 5,303,378 | 4/1994 | Cohen | 395/700 |
| 5,491,826 | 2/1996 | Koino | 395/775 |

OTHER PUBLICATIONS

IBM Corp, "Allocating Heap and Stack Memory", IBM Technical Disclosure Bulletin, vol. 34, Nr. 5, p. 464–465. Oct. 1, 1991.

*Primary Examiner*—Jack B. Harvey
*Assistant Examiner*—Sumati Lefkowitz
*Attorney, Agent, or Firm*—Klarquist Sparkman Campbell Leigh & Whinston LLP

[57] ABSTRACT

The stack pointer register in a computer is made available for general purpose use by programs executing at lower privilege levels than interrupt handlers. A set of instructions in such programs, excluding stack operations, stores data other than the stack pointer, such as operands, and the like, in the stack pointer register. When switching execution to an interrupt handler on an interrupt, return address data for the currently executing program is pushed onto a stack at the interrupt handler's privilege level. Thus, storing other data in the stack pointer register does not result in stack corruption. Also, these instructions can store data in a scratch portion of a stack segment beyond the current stack pointer.

13 Claims, 5 Drawing Sheets

GENERAL PURPOSE USE OF A STACK POINTER REGISTER

FIELD OF THE INVENTION

This invention relates generally to special purpose stack pointer registers in microprocessors, and more particularly to use of such a register for general purpose data storage.

BACKGROUND OF THE INVENTION

Computers generally employ several types of memory for data storage. Many computers have at least registers in a central processing unit ("CPU") or microprocessor, and a main memory for data storage. Register storage generally provides the fastest access time for storage and retrieval of data. However, because of cost and size considerations, computers generally have a limited number of registers which store a relatively small amount of data. By contrast, a computer's main memory generally stores a relatively large amount of data, but provides much slower access times. Typical computers may also have an intermediate or cache memory which provides a quicker average access time to data stored in main memory, and mass storage devices which provide non-volatile data storage.

Because register storage is typically very limited in amount, most of the data for operations in a program is stored in the main memory of a computer. The data is moved from main memory to register storage as required during program execution. Because of the slow access time of main memory, execution of program operations for which data must be moved to or from main memory is generally slower than operations using data already in register storage. Typically, the computer is put into a "wait state," delaying the execution of such operations, while the data access to main memory is completed. Program operations using data already in register storage need not be delayed for a memory access, and generally execute more quickly. Accordingly, programmers desiring to increase the speed of program execution generally arrange a program's operations to minimize transfers of data between the main memory and register storage.

In a typical computer, the CPU includes both general purpose and special purpose registers. General purpose registers are used for storing operands, or pointers to operands in memory which are used for operations executed on the CPU. Special purpose registers generally store data related to limited purposes, such as for storing data relating to control, exceptions, memory management, and the like. For example, in many computers, an instruction register is provided for the limited purpose of storing a pointer to the currently executing instruction. Such special purpose registers generally are not available for general purpose use (i.e. storage of operands and results of operations).

Some computers, such as personal computers using the 80386, 80486 and Pentium™ microprocessors available from Intel Corporation (hereafter "Intel microprocessors"), provide a special purpose register herein referred to as a stack pointer register (the "SP" or "ESP" register in the Intel microprocessors). The stack pointer register is used to implement a type of data storage generally known as a stack. In computer systems which use the Intel microprocessors, the stack comprises a set of consecutive memory locations in main memory which is referred to as a stack segment. (Data, referred to as a segment selector, which identifies the stack segment is contained in a separate stack segment register in the Intel microprocessors.) The stack pointer register contains a pointer (the "stack pointer") to a location in the stack segment of the last data "pushed" onto the stack. The Intel microprocessors respond to an instruction set which includes two stack operations, generally known as push and pop. The push operation stores additional data in a sequential order onto the stack, while the pop operation removes data from the stack in last-in-first-out ("LIFO") order.

In the Intel microprocessors, the stack is used to store a return address when switching execution between programs, such as when an interrupt occurs. Specifically, when the microprocessor receives an interrupt, the address of the instruction currently being executed is pushed onto the stack. The starting address of an interrupt handler (a program for servicing an interrupt) is then loaded into the instruction register from a predetermined location in main memory, and the microprocessor begins executing the interrupt handler. After completing execution of the interrupt handler, the microprocessor returns to the previously executing program by popping the address of the instruction where program execution left off from the stack, and loading that address into the instruction register.

In the Intel microprocessors, an interrupt can occur at any time. Accordingly, if data other than the stack pointer (i.e. the address of the last data pushed onto the stack) is stored into the stack pointer register, a subsequent interrupt can cause the current instruction address to be stored at other than the next sequential location in the stack segment, possibly overwriting data previously stored in the stack. (Haphazardly overwriting data in a stack in this manner is herein referred to as "corrupting" the stack.) For this reason, the stack pointer register has not previously been used for general purpose storage of operands and results.

SUMMARY OF THE INVENTION

The present invention provides a method and apparatus for general purpose use of a stack pointer register which avoids stack corruption and other drawbacks of the prior art. According to the invention, a program is executed at a lower privilege level than an interrupt handler to avoid stack corruption when using the stack pointer register for general purposes. Some computers, such as those having the Intel microprocessors and other like microprocessors, provide a protected mode of operation. In the protected mode, programs execute at any of a plurality of privilege levels (also known as "rings"). A program executing at one privilege level has limited access to data and programs having other privilege levels. Specifically, programs executing at a low privilege level are not allowed access to data in segments having higher privilege levels. Programs at a high privilege level cannot execute code of programs having lower privilege levels.

In the Intel microprocessor, separate stack segments and stack pointers are used for each privilege level. When the interrupt handler is at a higher privilege level than the executing program, the microprocessor switches to the interrupt handler's privilege level on receiving an interrupt. The return address of the executing program is not pushed onto the stack until after switching to the interrupt handler's privilege level. Accordingly, the return address is stored in the stack segment of the interrupt handler's privilege level and not that of the currently executing program.

According to one aspect of the invention, a group of one or more operations in a program stores data other than the stack pointer in the stack pointer register. The stack pointer register is used as an additional general purpose register, for example, to store operands and results of the operations. By storing this data in the stack pointer register, more data for the operations can be kept in register storage to minimize the transfer of data to and from main memory. This can prove particularly beneficial in a continuously repeated group of operations, such as in a critical loop of a program. Prior to executing the group of operations, the stack pointer contained in the stack pointer register is stored to memory. The stack pointer is later restored to the stack pointer register from memory after executing the operations. To avoid stack corruption, the program should exclude any stack operations between storing and restoring of the stack pointer. The program can otherwise perform stack operations as usual. Because the microprocessor switches to the interrupt handler's privilege level before the program's current return address is stored on the stack, interrupts occurring between the storing and restoring of the stack pointer do not result in stack corruption.

According to another aspect of the invention, a group of operations in a program stores data in the stack segment beyond the memory location indicated by the stack pointer currently stored in the stack pointer register. This part of the stack segment beyond the current stack pointer can serve as a "scratch" space for temporary data storage by these operations. Because the data is written into the stack segment past the stack pointer, no valid data in the stack is overwritten. Again, the group of operations should exclude stack operations to avoid stack corruption and loss of the data in the scratch space.

Additional features and advantages of the invention will be made apparent from the following detailed description of a preferred embodiment which proceeds with reference to the accompanying drawings.

DETAILED DESCRIPTION OF THE PREFERRED EMBODIMENTS

Figure 1:
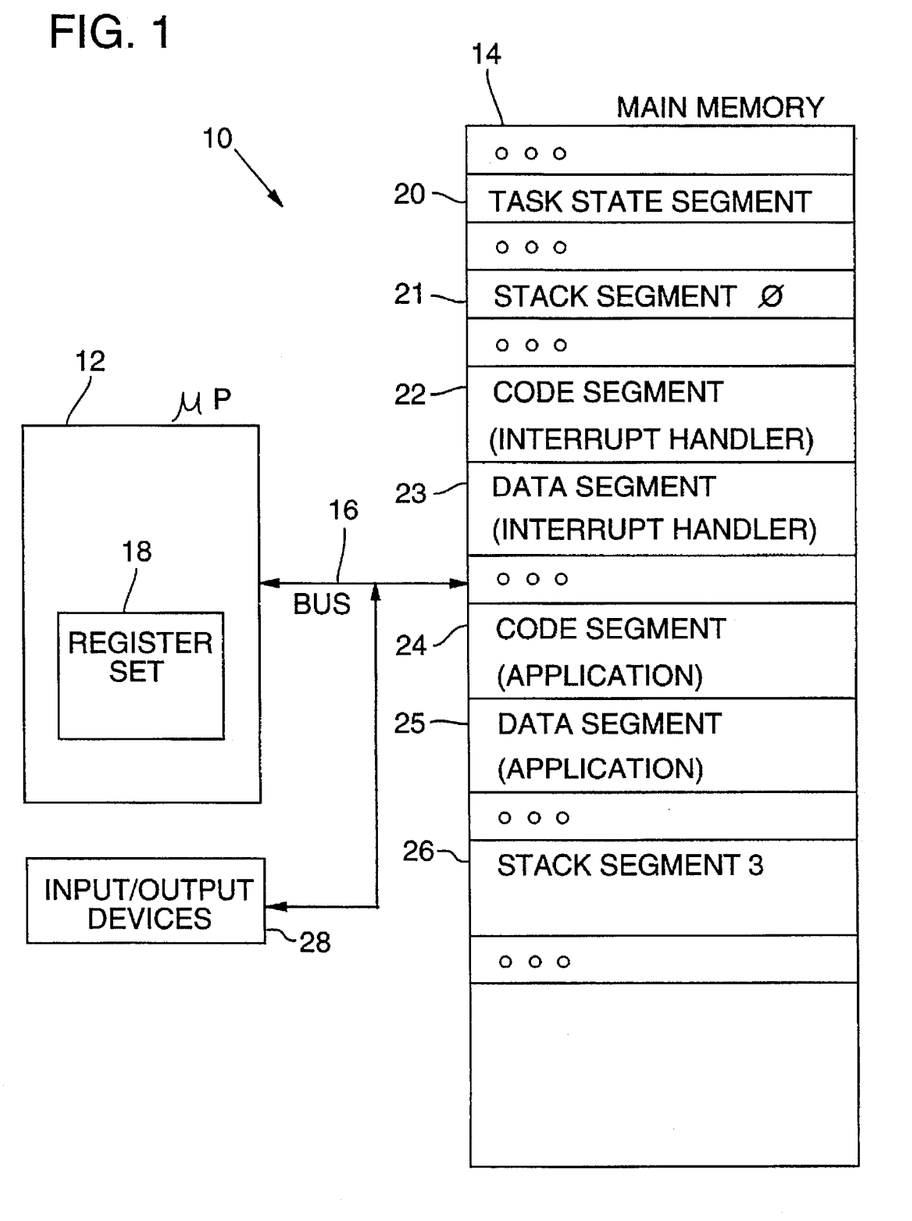
FIG. 1 is a block diagram of a computer for practicing a preferred embodiment of the invention.

With reference to FIG. 1, a preferred embodiment of the invention is practiced with a computer 10, such as the IBM compatible personal computers available from manufacturers such as IBM, Compaq, and many others. The computer 10 generally comprises a microprocessor 12 and a main memory 14 which are interconnected with a bus 16. The microprocessor 12 is preferably an Intel 80386 microprocessor or later version compatible microprocessor, having a protected mode of operation and a set of registers 18 which includes a stack pointer register described below. Other processors which provide a stack pointer register and protected mode operation also may be suitable for use with the invention.

The main memory 14 is preferably implemented as a semiconductor, random access memory ("RAM") which provides a plurality of sequentially organized memory locations addressable by the microprocessor 12 for storing or reading data. Such semiconductor RAM can be operated in conjunction with a magnetic disk or like mass storage device to provide a larger "virtual" address space. Other types of computer memory, such as read only memory, magnetic or optical based memories, also may be suitably used as the memory 14. In the preferred embodiment, the memory locations of the main memory 14 are divided into separate segments 20–26 (sometimes referred to as a "segmented address space"). The segments generally include code segments 22, 24, data segments 23, 25, stack segments 21, 26, and a task state segment 20. In general, the code segments 22, 24 each contain a sequential set of instructions for a task or program which specify operations to be performed by the microprocessor 12. The data segments 23, 25 contain data to be used by a task or program. Stack segments 21, 26 contain data which is accessed by the microprocessor 12 as a stack. The task state segment 20 contains data used by the microprocessor 12 to manage concurrent execution of multiple separate tasks by the microprocessor. Other types of segments also may be provided.

The computer 10 also preferably comprises an input/output device 28 for accepting user input and for providing a user understandable output. The input/output device 210 may comprise, for example, a keyboard, a mouse pointing device, and the like for user input, as well as a CRT or LCD screen, a printer, or the like for displaying information to the user. The computer 10 also can include other computer peripheral devices (not shown).

Figure 2:
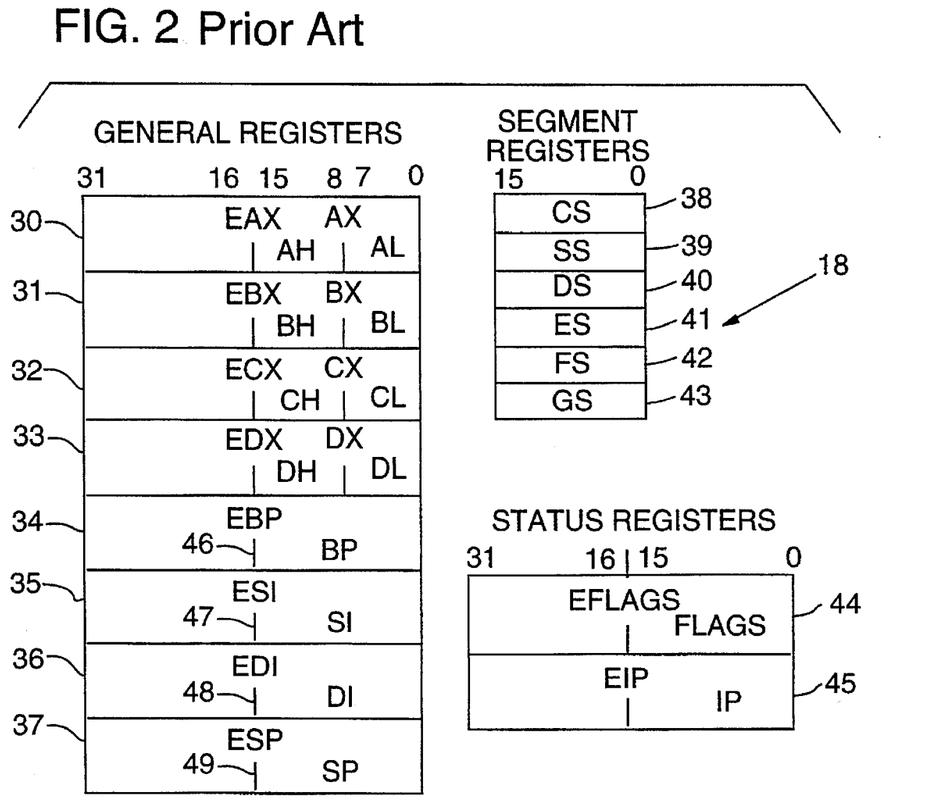
FIG. 2 is a block diagram of a register set, including a stack pointer register and stack segment register, in a prior art microprocessor utilized in the computer of FIG. 1.

Referring to FIG. 2, the register set 18 of the microprocessor 12 includes eight 32-bit general registers 30–37, six 16-bit segment registers 38–43, and two 32-bit status registers 44–45. The general registers 30–37 are each adapted to store operands and pointers to operands in memory. General registers EAX 30, EBX 31, ECX 32, and EDX 33 are generally used for storing operands for operations executed by the microprocessor 12. These registers can be addressed in their entirety (the full 32-bits) by an instruction executing on the microprocessor 12. Alternatively, a 16-bit or 8-bit portion of these registers can be separately addressed for storing smaller operands.

General registers EBP 34, ESI 35, EDI 36, and ESP 37, however, are generally used for storing 32-bit pointers to operands stored in the main memory 14. Each of these registers also have 16-bit portions BP 46, SI 47, DI 48, and SP 49 which are separately addressable for storing 16-bit pointers to operands in the main memory 14. These pointers are combined with data stored in the segment registers 38–43 to obtain an actual physical address of an operand in the main memory 14. The segment registers 38–43 store data (referred to as "segment selectors") specifying particular segments in the main memory 14 which are currently in use by the microprocessor 12. For example, a segment selector in a CS register 38 specifies a code segment (e.g. code segments 22, 24 in FIG. 1) in the main memory 14 containing the instructions of a program currently being executed by the microprocessor 12. A segment selector in a DS register 40 specifies a data segment (e.g. data segments 23, 25 in FIG. 1) containing data of the currently executing program. Although the registers 30–33 generally store operands and the registers 34–37 generally store pointers to operands in memory, any of the registers 30–37 can store either an operand or a pointer to an operand.

The status registers 44–45 store data relating to the state of execution of the microprocessor 12. An extended flags ("EFLAGS") register 44 stores a plurality of bits, referred to as flags, which indicate the status of the microprocessor and control the execution of some operations by the microprocessor. The instruction pointer ("EIP") register 45 stores a pointer to an instruction which is to be executed next by the microprocessor 12 (unless the order of instruction execution is altered by a jump operation, interrupt, or the like). The instruction pointer stored in the EIP register 45 is combined with a segment selector in the CS register 38 to obtain an address of the next instruction in the current code segment of the main memory 14.

Figure 3:
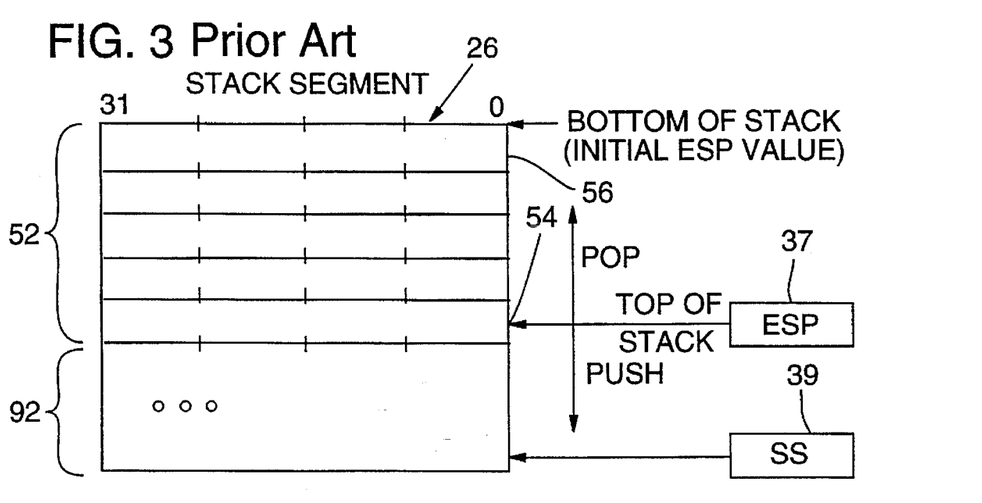
FIG. 3 is a block diagram of a conventional stack segment in a main memory of the computer of FIG. 1.

With reference to FIG. 3, the stack pointer ("ESP") register 37 and the stack segment ("SS") register 39 are used by the microprocessor 12 (FIG. 1) in performing operations which access data in a stack segment. The SS register 39 contains a segment selector which specifies a current stack segment (e.g. stack segment 26 in the main memory 14 of FIG. 1). This data is combined with a stack pointer in the ESP register 37 to address data in the stack segment 26. The microprocessor inserts data into the stack segment with "push" operations. Push operations insert data into the stack segment 26 in a descending sequential order starting at its highest address. The microprocessor removes data from the stack segment 26 in LIFO order using "pop" operations. A set of locations in the stack segment currently containing data is referred to as a "stack" 52. The stack pointer in the ESP register 37 always points to a location (referred to as a "top" of the stack) 54 of the last data inserted with a push operation. The location at the highest address in the stack segment is referred to as the "bottom" 56 of the stack 52.

As a general rule, operands and pointers to operands in memory, other than the stack pointer (to the current top 54 of the stack 52), are not stored in the stack pointer register 37. The reason for this rule is that the microprocessor 12 utilizes the contents of the stack pointer register 37 when performing push and pop operations. When performing a push operation, the microprocessor 12 interprets the contents of the stack pointer register 37 as the stack pointer. Accordingly, the microprocessor 12 decrements the stack pointer register 37, and stores data at the location indicated by the register. When performing a pop operation, the microprocessor 12 reads the data at the location indicated by the contents of the stack pointer register 37, and increments the register. If data other than the current stack pointer is stored in the stack pointer register 37, a subsequent push operation will store data somewhere in the stack segment, possibly overwriting valid data in the stack 52. A subsequent pop operation, on the other hand, is likely to result in reading data from elsewhere in the stack segment 26 than the top 54 of the stack. These operations also cause the stack pointer register to be incremented or decremented, altering its value.

Even though a program itself may not include push and pop stack operations, the microprocessor 12 performs these stack operations when an interrupt is received. When an interrupt is received the microprocessor transfers program execution to another program referred to herein as an interrupt handler. In transferring execution to the interrupt handler, the microprocessor 12 stores the current data from the instruction pointer register 45 and code segment register 38 (which constitute a "return address" for the program), as well as the flags register 44, with push operations. The microprocessor 12 also retrieves data relating to a starting address of the interrupt handler's first instruction for loading into the instruction pointer register 45 and code segment register 38. The interrupt handler's starting address is retrieved from a predetermined location (not shown) in the memory 14 sometimes referred to as an interrupt vector. In the computer 10, interrupts may occur at any time during program execution. Accordingly, by storing values other than the current stack pointer in the stack pointer register, the stack can potentially become corrupted by the push operations performed when switching to the interrupt handler.

Figure 4:
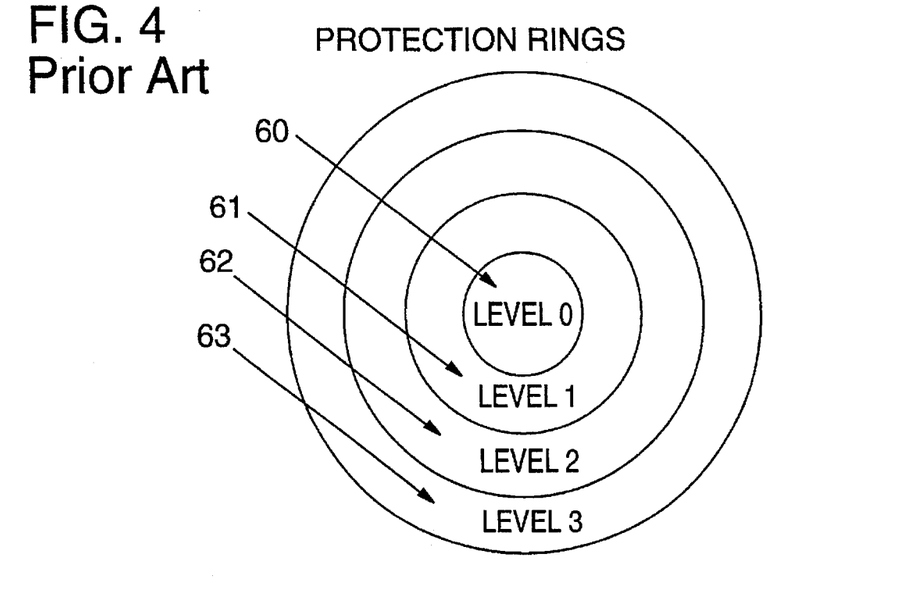
FIG. 4 is a diagram illustrating a set of privilege levels in a protected mode of operation of the prior art microprocessor in the computer of FIG. 1.

With reference to FIGS. 1 and 4, the microprocessor 12 provides four privilege levels (also referred to as privilege rings) 60–63 in a protected mode of operation. The privilege levels 60–63 are ranked in order from a highest privilege level ("ring 0") 60 to a lowest privilege level ("ring 3") 63. The purpose of the privilege levels is to provide reliable multi-tasking (i.e. concurrent execution of multiple separate programs or tasks) by limiting access of a program to the stored data and instructions of other programs. Each program which is being executed by the microprocessor is assigned to a privilege level. Programs executing at a lower privilege level are prevented from accessing the instructions and data of programs at a higher privilege level. In general, programs which are deemed most reliable, such as an operating system program, are assigned to the highest privilege level 60. Less reliable programs are assigned to lower privilege levels 61–63. Application programs are generally assigned to the lowest privilege level 63. Accordingly, when an application program crashes, the operating system can remain intact and continue executing.

To limit access to the data and instructions of other programs, the memory segments 20–26 in the memory 14 (FIG. 1) which are allotted to a program are assigned its respective privilege level 60–63. For example, the code and data segments 24, 25 containing the instructions and data of a program executing at the lowest privilege level 63 are also assigned to that privilege level. With each operation of a program that accesses the main memory 14, the microprocessor 12 checks the assigned privilege level of the segment being accessed against that of the program. The microprocessor 12 blocks program operations which attempt to access data in a segment assigned to a higher privilege level, and generates an error. As is the case for code and data segments 22–25, each of the stack segments 22, 26 also is assigned to a privilege level 60–63. Again, programs executing on the processor 12 cannot access stack segments which have been assigned a higher privilege level.

Figure 5:
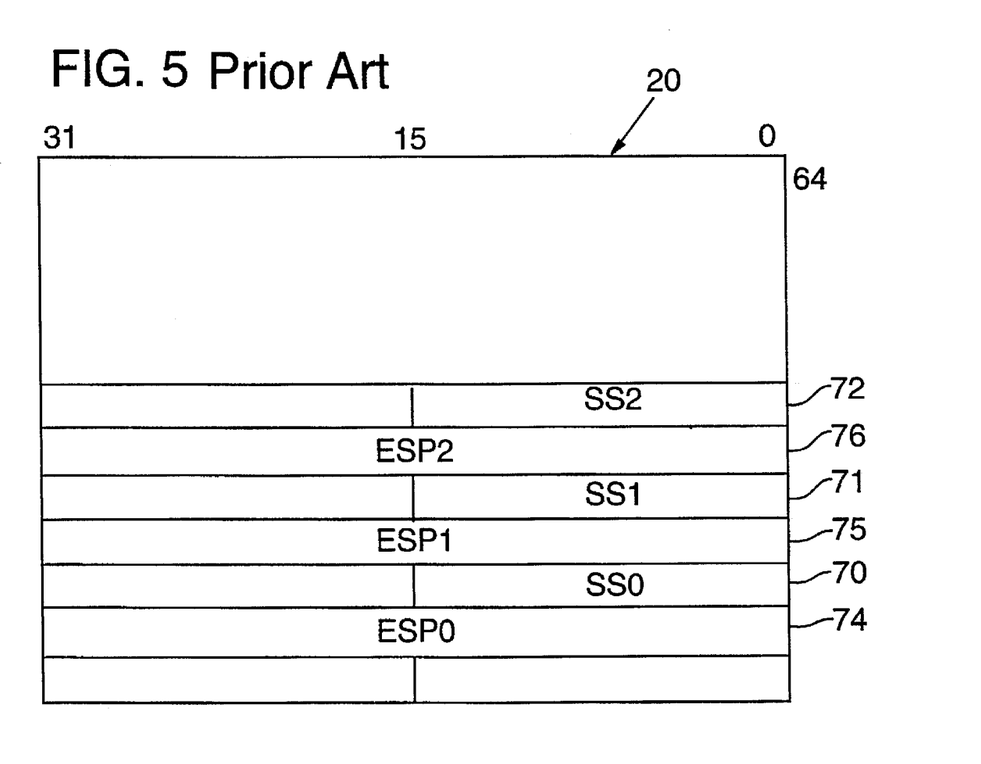
FIG. 5 is a block diagram of a conventional task state segment in the main memory of the computer of FIG. 1.

With reference to FIGS. 1, 4, and 5, separate stack segments 21, 26 (FIG. 1) are allocated in the main memory 14 of the computer 10 for use by programs executing at different privilege levels 60–63 (FIG. 4). For example, the stack segment 21 is assigned to privilege level 60, while the stack segment 26 is assigned to the privilege level 63. When the microprocessor 12 switches execution between programs having different privilege levels, the stack segment used by the microprocessor for push and pop operations also is switched to the stack segment at the new privilege level. For switching between programs, the microprocessor 12 stores data relating to execution of each program in a task state segment 20 of that program. The task state segment 20 stores, among other data, a segment selector 70–72 and a stack pointer 74–76 for initial stack segments of higher privilege levels. When switching execution to a program having a higher privilege level, the microprocessor 12 loads the stack pointer register 37 and the stack segment register 39 with the segment selector and stack pointer in the task state segment for the stack segment at that privilege level. For example, when switching execution to the privilege level 60, the microprocessor loads the stack pointer register and the stack segment register with the segment selector 70 and stack pointer 74 for the stack segment 21.

In accordance with the invention, an application program executing on the computer 10 (FIG. 1) uses the stack pointer register 37 (FIG. 2) to store data other than the stack pointer itself, such as operands and pointers to operands, without potentially causing stack corruption. Stack corruption is avoided by assigning the application program a lower privilege level than that of an interrupt handler. Preferably, the application program is assigned to execute at the privilege level 63, and the interrupt handler to the privilege level 60. When switching execution to the interrupt handler on receiving an interrupt, the microprocessor 12 changes to the stack segment which is assigned the same privilege level as the interrupt handler before performing any push operations which store the program's return address data. Also, when changing stack segments, the microprocessor 12 first stores the current contents of the stack pointer and stack segment registers 37, 39 in the application program's task state segment 20 before loading these registers with the stack segment and stack pointer of the new stack segment. Then, upon returning execution from the interrupt handler to the application program, the microprocessor 12 can restore their prior contents to these registers.

In the preferred embodiment of the invention, the application program can allocate either a 16-bit or a 32-bit segment of the memory 14 as the stack segment 26. If the stack segment 26 is allocated as a 16-bit segment, the microprocessor 12 stores only the contents of the lower 16-bit portion (referred to as the SP register) 49 of the stack pointer register 37. When execution is later returned to the application program, only these lower 16-bits are restored. The upper 16-bits of the stack pointer register 37, however, are typically modified when execution is switched to the interrupt handler. Accordingly, when a 16-bit segment of the memory 14 is allocated as the stack segment 26, the application program should make use of only the lower 16-bit portion 49 of the stack pointer register 37 for storing data to avoid loss of the stored data. To allow use of the full 32-bits of the stack pointer register 37, the application program can allocate a 32-bit segment as the stack segment 26, such as by loading a segment selector for a 32-bit segment into the stack segment register 39.

Figure 6:
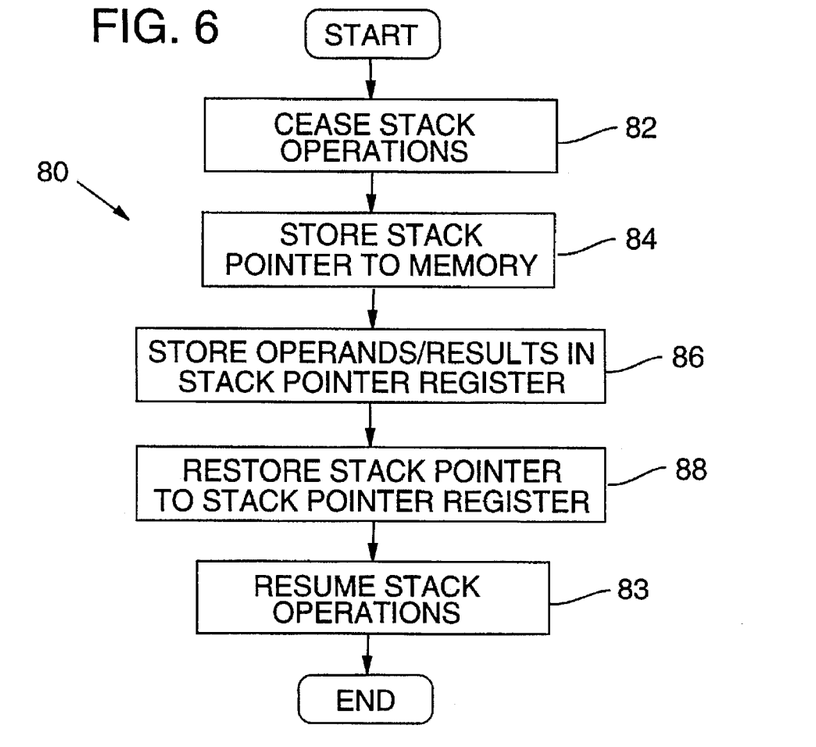
FIG. 6 is a flow chart of a method according to a first preferred embodiment of the invention for general purpose use of the stack pointer register of FIG. 2 according to a first preferred embodiment of the invention.

Referring now to FIG. 6, in a method 80 according to the preferred embodiment of the invention, general use of the stack pointer register 37 is made in storing data other than the stack pointer. Preferably, the method 80 is implemented by a group of instructions in the application program executing on the computer 10. The instructions may, for example, form a critical loop of the application program. By storing other data in the stack pointer register 37, the application program can eliminate one or more memory transfers in the critical loop, and thereby increase its speed of execution.

As indicated at steps 82–83, while the stack pointer register 37 is to be used for storing data other than the stack pointer, stack operations cannot be performed by the microprocessor 12. The instructions implementing the method in the application program should therefore exclude any instructions directing the microprocessor 12 to perform a stack operation. As explained above, stack operations performed while other data is stored in the stack pointer register 37 can potentially corrupt the stack 50.

In an initial step 84 of the method 80, the microprocessor 12 executing the instructions stores the stack pointer contained in the stack pointer register 37 to a location in the memory 14, such as in the data segment 25 associated with the program. This preserves the current stack pointer for later restoration. The microprocessor 12 can then proceed, at step 86, to store other data in the stack pointer register 37. At this point, the stack pointer register 37 can be used for general data storage just as any of the other general registers 30–36. Such general use of the stack pointer register 37 does not cause corruption of the stack segment 26 at the application program's privilege level 63 as no stack operations affecting the stack segment 26 can be performed. As described above, in an interrupt (which may occur at any time during performance of the method 80), the application program's return address is pushed onto the interrupt handler's stack segment 21 at the interrupt handler's privilege level 60 due to the interrupt handler's assignment to a higher privilege level than the application program. Further, according to the method, the application program excludes stack operations during this time.

In a later step 88, once general purpose use of the stack pointer register 37 is completed, the microprocessor 12 restores the stack pointer by loading it back into the stack pointer register 37 from its storage location in the memory 14. As indicated at step 83, the application program can then resume use of stack operations.

If an interrupt occurs during the method 80, the processor switches execution from the application program which contains instructions for performing the method 80 to an interrupt handler. As described above, when this switch in execution takes place, the processor also switches the stack segment used for push and pop operations from the stack segment 26 at the application program's privilege level 63 to the stack segment 21 at the interrupt handler's privilege level 60. This switch takes place before a return address for the application program is stored with a push operation. The return address therefore is stored on the stack segment 21. Accordingly, due to the interrupt handler's assignment to a higher privilege level than the application program and the suppression of stack operations during general purpose use of the stack pointer register, general purpose use of the stack pointer register can be made without corruption of the stack.

Figure 7:
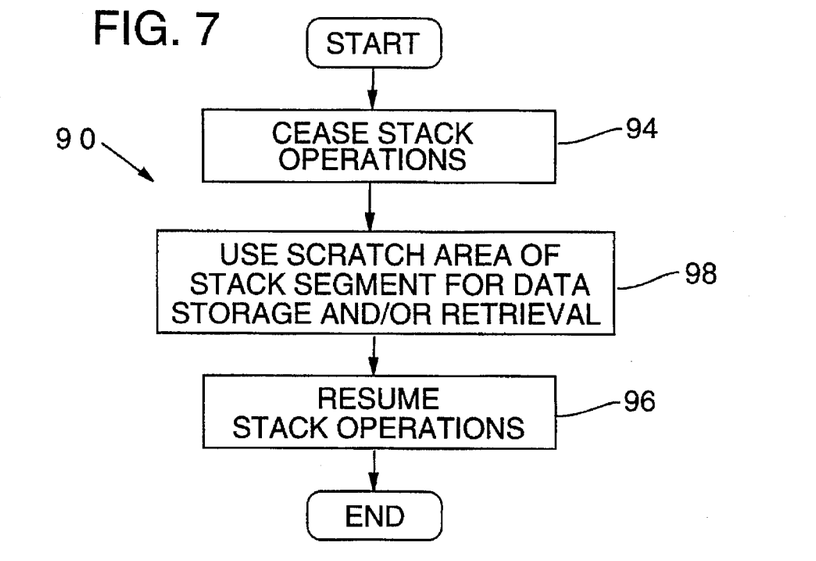
FIG. 7 is a flow chart of another method according to a second preferred embodiment of the invention for general purpose use of the stack pointer register of FIG. 2 according to a second preferred embodiment of the invention.

With reference to FIGS. 3 and 7, the storage of a program's return address in the stack segment 21 at the interrupt handler's privilege level 60 by the microprocessor 12 also makes it possible for the application program to utilize a portion 92 of the stack segment 26 beyond the stack pointer as additional storage in the main memory 14. In general, only a portion of the stack segment 26, i.e. the stack 52, is used for storing data. As described above, data is stored in the stack segment 26 using push and pop stack operations. These stack operations, however, store data in only a portion of the stack segment, i.e. the stack 52. The stack 52 grows downwardly as additional data is stored into the stack segment with push operations. Accordingly, data generally is not stored in the portion 92 beyond the stack pointer contained in the stack pointer register 37, because it may be overwritten if additional data is pushed onto the stack such as during an interrupt.

In a method 90 (FIG. 7) according to an alternative embodiment of the invention, the stack pointer register 37 is utilized to store and retrieve data in the "scratch" space portion 92 (FIG. 3) of the application program's stack segment 26. The method 90 is preferably implemented in a set of instructions in the application program. As indicated at steps 94 and 96 of the method 90, these instructions preferably exclude stack operations during a step 98.

During a step 98, the application program includes one or more instructions which store, retrieve, and/or manipulate data in the scratch space portion 92 of the stack segment 26. The instructions can, for example, access data at addresses in the stack segment 26 which are at offsets from the stack pointer in the stack pointer register 37, such as a predetermined number of memory locations beyond the top 54 of the stack 52. The exemplary assembly code instructions in the following Table 1 illustrate instructions for accessing data in the scratch portion 92 at offsets from the stack pointer in the stack pointer register 37.

TABLE 1

| Code for Accessing Data in Scratch Portion 92 at Offsets From the Stack Pointer. | |
|---|---|
| Code | Comments |
| mov bx, sp | copy stack pointer to BX register |
| mov ax, ss: [bx-4*4] | access data at offset of four double words from stack pointer. |

Alternatively, the instructions may access data at offsets from the lowest address in the stack segment 26 up to the top 54 of the stack 52. The exemplary assembly code instructions in the following Table 2 illustrate instructions for accessing data in the scratch portion 92 at offsets from the base address of the stack segment.

TABLE 2

| Code For Accessing Data in Scratch Portion at Offsets From Base Address of Stack Segment. | |
|---|---|
| Code | Comments |
| mov bx, 6*4 | move offset of six double words into BX register |
| mov ax: [bx] | access data at offset from base address of stack segment |

Because no stack operations are performed with the stack segment 26 by the application program or due to an interrupt during the step 98, the data stored by the instructions in the scratch space portion 92 cannot be overwritten. At step 96, after execution of the instructions which store and retrieve data from the scratch portion 90 is complete, the application program can resume stack operations.

Figure 8:
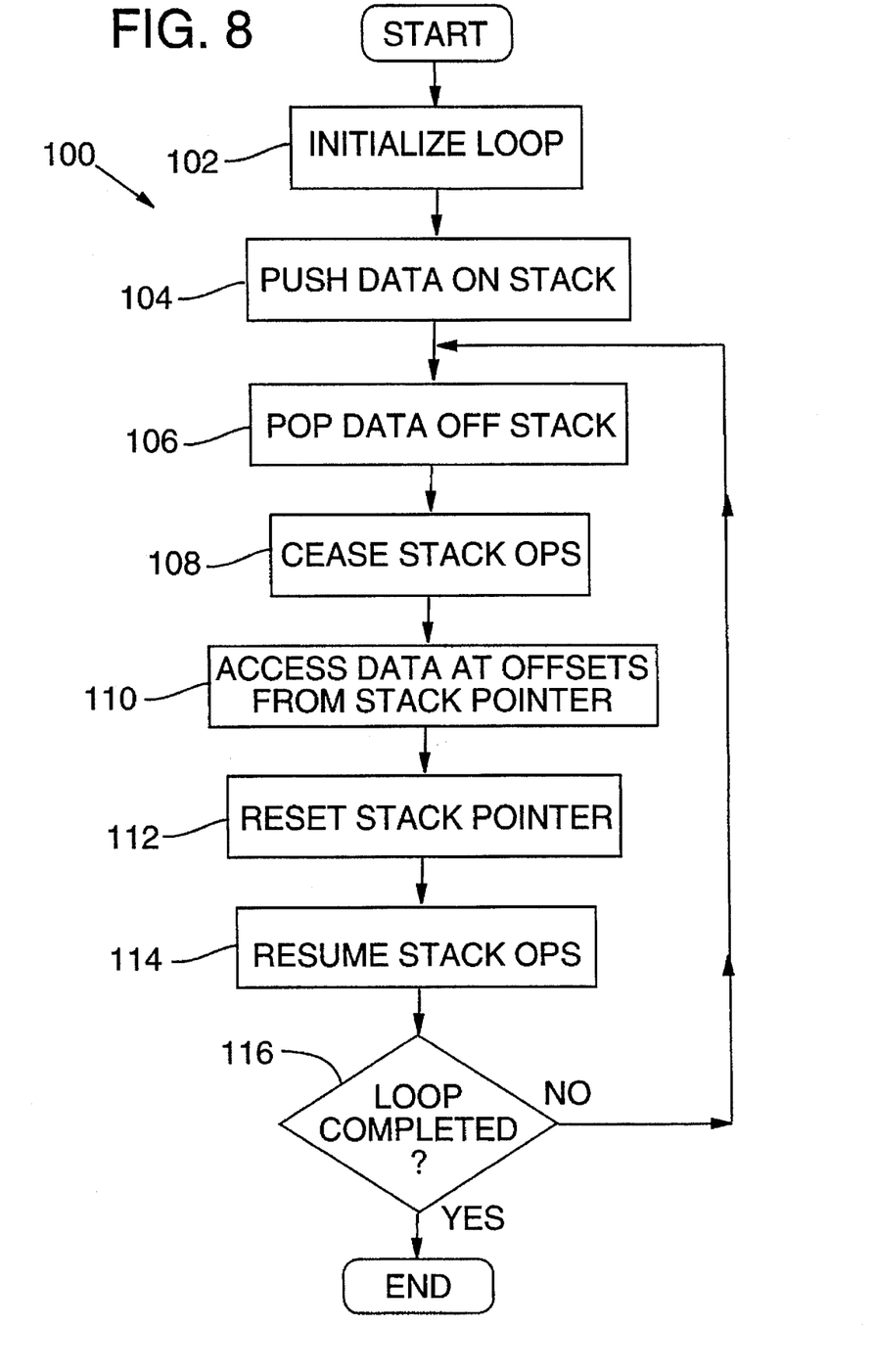
FIG. 8 is a flow chart of a method according to a third preferred embodiment of the invention which utilizes the method of FIG. 7.

With reference to FIGS. 3 and 8, a method 100 (FIG. 8) according to a further preferred embodiment of the invention illustrates an application of the method 90 (FIG. 7) which accesses data in the scratch portion 92 (FIG. 3) of the stack segment. The method 100 further takes advantage of the fact that data which is pushed onto the stack 52 (FIG. 3) and then retrieved with pop operations, remains available in the scratch portion 92 until overwritten (such as by subsequent push operations). The data which remains in the scratch portion 92 after a pop operation, can be accessed at offsets from the stack pointer 54 (referred to herein as "forward referencing").

The method 100 is particularly applicable to application programs in which a function call is performed within a loop (a set of repeated instructions). In general, when performing a function call, any parameters for the function call (i.e. input values which are passed to the called function) are pushed onto the stack 52 prior to a statement invoking the function call. The function then accesses the parameters by popping them off the stack 52. Calling the function therefore results in the parameters being popped off the stack 52. In the prior art, the parameters are modified as necessary and again pushed onto the stack 52 in each iteration of the loop as in the exemplary assembly code in Table 3.

TABLE 3

| Prior Art Function Call Within a Loop. | |
|---|---|
| Code | Comment |
| mov cx, 1000 | set iteration count for loop |
| top | start of loop |
| push A | parameter 1 |
| push B | parameter 2 |
| push C | parameter 3 |
| push D | parameter 4 |
| push E | parameter 5 |
| call Function | calls function, popping parameters off stack |
| inc A | modify parameter 1 for next iteration |
| dec cx | decrement iteration count |
| jnz top | repeat loop until iteration count is zero |
| ret | |

In the method 100, forward referencing is utilized to modify parameters for a next iteration of a loop while the parameters are stored in the scratch portion 92 after a function call. The method also avoids again pushing the parameters onto the stack 52 by resetting the stack pointer 54 after the function call to point to the last parameter previously pushed onto the stack. Exemplary assembly code implementing the method 100 is illustrated in the following Table 4. The reader should note that this exemplary code depends on the function called in the loop to not modify data in the scratch portion 92.

TABLE 4

| Code for Forward Referencing Using the Method 100. | |
|---|---|
| Code | Comments |
| mov cx, 1000 | set iteration count for loop |
| push A | parameter 1 |
| push B | parameter 2 |
| push C | parameter 3 |
| push D | parameter 4 |
| push E | parameter S |
| top: | start loop |
| call Function | calls function, popping parameters off stack |
| mov bx, sp | copies stack pointer to BX register |
| inc dword ptr ss: [bx-4] | increments parameter 1 in Scratch Portion 92 |
| sub sp, 10*4 | resets stack pointer so that parameter 5 is again at top of stack |
| dec cs | decrement iteration count |
| jnz top | repeat loop until iteration count is zero |
| ret | |

In an initial step 102 of the method 100, a loop in an application program is initialized, such as by code which loads a register with a number of iterations in the loop. For example, the code, "mov cx, 1000," in Table 4 sets up the CX register to be used as a counter for the loop. In a next step 104, data which is to be forward referenced is then pushed onto the stack. The step 104 of pushing data onto the stack is done prior to entering the loop, and therefore not repeated with each iteration of the loop.

The loop in the method 100 comprises steps 106–114. In the first step 106 of the loop, the data is popped back off the stack 52, such as by invoking a function which utilizes the pushed data as its parameters (e.g. "call Function" code in Table 4). Such a function includes pop operations for retrieving its parameters from the stack. Such pop operations, however, leave the data stored unchanged in the scratch portion 92 of the stack segment after retrieval. The data therefore remains available for access and manipulation, such as by forward referencing.

In a next portion of the loop between steps 108 and 114, stack operations are avoided In a step 110 between the steps 108 and 114, the data in the scratch portion 92 is accessed by forward referencing. More specifically, the data is accessed at offsets from the stack pointer 54. For example, in the code of Table 4, the last parameter popped off the stack is accessed at an offset of four bytes (i.e. one double word length) from the stack pointer 54 (e.g. "inc dword ptr ss:[bx-4]" code in Table 4). Other data can be accessed at offsets related to the order in which the data was popped off the stack (specifically, at an offset related to the amount of data popped off the stack after the data to be accessed). In a step 112 also between the steps 108 and 114, the stack pointer 54 is reset to again point to the last data pushed onto the stack before entering the loop, such as by subtracting the length in bytes of the data popped off the stack (e.g. "sub sp, 10*4" code in Table 4). This effectively moves the data previously popped off the stack in step 106 back into the stack without performing any stack operations (e.g. push operations). After the steps 110 and 112, the stack operations can resume.

In a step 116 at the end of the loop, a test is performed to determine if all iterations of the loop are completed. In the illustrated embodiment, this test is performed by decrementing the iteration count at the end of each iteration then determining whether the iteration count has reached zero (e.g. "dec cx" and "jnz top" code in Table 4). If the loop is not completed, the steps 106–116 are repeated for the next iteration. If, however, the loop is completed, the method 100 ends.

As with the method 80, the successful use of the methods 90 and 100 depends on the interrupt handler being set to execute at a different privilege level than an application program which implements these methods. With the interrupt handler set at a different privilege level, the processor stores a return address for the application program on the stack at another privilege level whenever an interrupt occurs. Accordingly, if an interrupt occurs during execution of the methods 90 and 100, data in the stack segment at the privilege level of the application program is not overwritten. The data in the scratch portion 92 therefore can be safely utilized.

Having described and illustrated the principles of our invention with reference to a preferred embodiment, it will be recognized that the preferred embodiment can be modified in arrangement and detail without departing from such principles. For example, the application program and interrupt program can be assigned to any of the privilege levels 60–63, so long as they are assigned different privilege levels. Further, the invention can be practiced on processors having different numbers and arrangements of privilege levels.

For another example, the invention is not limited to general purpose use of the ESP and SP registers in the Intel microprocessors, but may be applied to freeing of other specialized registers for general purpose use. Specifically, other specialized registers containing pointer or address data related to the stack (e.g. the SS registers in the Intel microprocessor), and which are included in any processor having a protected mode of operation with multiple privilege levels can be freed for general purpose use according to the invention. Additionally, the invention can be applied to freeing specialized registers intended to contain pointer or address data for storage resources of the processor other than a stack for general purpose use. Yet further, the invention can be applied to freeing specialized registers intended to contain any control information for any processor resources (including those resources other than data storage resources). As in the methods 80, 90 and 100, the information normally contained in the register should be saved prior to general purpose use and restored thereafter. Further, during general purpose use, use of the resource to which the specialize register relates is discontinued. Yet further, setting the interrupt handler to execute at a different privilege level should avoid use of the controlled resource during any interrupts.

In view of the many possible embodiments to which the principles of our invention may be put, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. A method for iteratively accessing a stack memory, comprising:

performing one or more stack operations for pushing one or more parameters onto a stack memory;

performing a sequence of operations repeated within a loop, the step of performing the operations including for each iteration of the loop:

calling a function including stack operations for popping the parameters from the stack memory;

modifying one or more of the parameters at locations in the stack memory beyond the current top stack element and at offsets from a stack pointer, the stack pointer indicating a current top stack element; and resetting the stack pointer to indicate a location in the stack memory previously containing the top stack element at a time prior to the parameters being popped from the stack memory.

2. In a processor having a stack pointer register and providing a plurality of privilege levels having separately allocated stack memory in a protected mode of operation, the processor operative to store a return address at a memory location indicated by a stack pointer in the stack pointer register within the stack memory allocated to a current privilege level on receiving an interrupt and further operative to switch the stack pointer in the stack pointer register when switching privilege levels, a method for general purpose use of the stack pointer register, comprising:

setting up an interrupt handler to execute at a first privilege level on the processor;

executing an application program comprising a plurality of instructions at a second privilege level other than the first privilege level on the processor, wherein executing the instructions of the application program comprises:

storing a stack pointer contained in the stack pointer register to a memory;

restoring the stack pointer from the memory to the stack pointer register; and between the steps of storing and restoring the stack pointer, performing one or more operations for storing data other than the stack pointer in the stack pointer register, the operations excluding any stack operations;

whereby on receiving an interrupt in executing the application program between the steps of storing and restoring the stack pointer, the processor switches to the first privilege level and stores a return address of the application program on the stack allocated to the first privilege level, the method thereby avoiding corruption of the stack allocated to the second privilege level when the stack pointer register stores data other than the stack pointer and an interrupt occurs.

3. The method of claim 2 comprising, between the steps of storing and restoring the stack pointer, performing one or more operations for storing calculation data in the stack pointer register.

4. The method of claim 2 comprising, between the steps of storing and restoring the stack pointer, performing one or more operations for storing operands and results of operations in the stack pointer register.

5. The method of claim 2 comprising, between the steps of storing and restoring the stack pointer, performing one or more operations for storing variable data in the stack pointer register.

6. In a processor having a stack pointer register and providing a plurality of privilege levels having separately allocated stack memory in a protected mode of operation, the processor operative to store a return address at a memory location indicated by a stack pointer in the stack pointer register within the stack memory allocated to a current privilege level on receiving an interrupt and further operative to switch the stack pointer in the stack pointer register when switching privilege levels, a method for general purpose use of the stack pointer register, comprising:

setting up an interrupt handler to execute at a first privilege level on the processor;

executing a program comprising a plurality of instructions at a second privilege level other than the first privilege level on the processor, the step of executing comprising:
performing a sequence of operations utilizing one or more locations in a stack memory beyond a location of a current top stack element for data storage and retrieval, the operations excluding stack operations;

whereby on receiving an interrupt in executing the program between the steps of storing and restoring the stack pointer, the processor switches to the first privilege level and stores a return address of the program on the stack allocated to the first privilege level, the method thereby avoiding corruption of the stack allocated to the second privilege level when the stack pointer register stores data other than the stack pointer and an interrupt occurs.

7. The method of claim 6 wherein the step of performing the sequence of operations comprises:

accessing data stored in the locations beyond the current top stack element at offsets from a stack pointer, the stack pointer indicating the current top stack element.

8. The method of claim 7 comprising:
resetting a stack pointer to indicate a location in the stack memory previously containing the top stack element.

9. The method of claim 6 comprising:
resetting a stack pointer to indicate a location in the stack memory previously containing the top stack element.

10. The method of claim 6 wherein the step of performing the sequence of operations comprises:
accessing data stored in the locations beyond the current top stack element at offsets from a base address of the stack memory.

11. In a processor having a stack pointer register and providing a plurality of privilege levels having separately allocated stack memory in a protected mode of operation, the processor operative to store a return address at a memory location indicated by a stack pointer in the stack pointer register within the stack memory allocated to a current privilege level on receiving an interrupt and further operative to switch the stack pointer in the stack pointer register when switching privilege levels, a method for general purpose use of the stack pointer register, comprising:

setting up an interrupt handler to execute at a first privilege level on the processor;

executing a program comprising a plurality of instructions at a second privilege level other than the first privilege level on the processor, the step of executing comprising:
performing one or more stack operations for pushing one or more parameters onto the stack memory allocated at the second privilege level;

performing a sequence of operations repeated within a loop, the step of performing the operations including for each iteration of the loop:

calling a function including stack operations for popping the parameters from the stack memory;

modifying one or more of the parameters at locations in the stack memory beyond the current top stack element and at offsets from a stack pointer, the stack pointer indicating a current top stack element; and resetting the stack pointer to indicate a location in the stack memory previously containing the top stack element at a time prior to the parameters being popped from the stack memory;

whereby on receiving an interrupt in executing the program between the steps of storing and restoring the stack pointer, the processor switches to the first privilege level and stores a return address of the program on the stack allocated to the first privilege level, the method thereby avoiding corruption of the stack allocated to the second privilege level when the stack pointer register stores data other than the stack pointer and an interrupt occurs.

12. An apparatus for general purpose use of a stack pointer register, comprising:

a stack pointer register;

a processor providing a plurality of privilege levels having separately allocated stack memory in a protected mode of operation, the processor operative to store a return address at a memory location indicated by a stack pointer in the stack pointer register within the stack memory allocated to a current privilege level on receiving an interrupt and further operative to switch the stack pointer in the stack pointer register when switching privilege levels;

a memory for storing an interrupt handler set-up to execute at a first privilege level, and for storing a program comprising a plurality of instructions at a second privilege level, the instructions comprising:

an instruction for storing a stack pointer from the stack pointer register to the memory;

an instruction for restoring the stack pointer to the stack pointer register from the memory; and between the instructions for storing and restoring the stack pointer, one or more instructions excluding stack operations for storing data other than the stack pointer in the stack pointer register;

whereby on receiving an interrupt in executing the program between executing the instructions for storing and restoring the stack pointer, the processor switches to the first privilege level and stores a return address of the program on the stack allocated to the first privilege level, the apparatus thereby avoiding corruption of the stack allocated to the second privilege level when the stack pointer register stores data other than the stack pointer and an interrupt occurs.

13. A storage medium having instructions therein for causing a computer to perform a method for general purpose use of a stack pointer register in a processor which provides a plurality of privilege levels having separately allocated stack memory in a protected mode of operation, the processor operative to store a return address at a memory location indicated by a stack pointer in the stack pointer register within the stack memory allocated to a current privilege level on receiving an interrupt and further operative to switch the stack pointer in the stack pointer register when switching privilege levels, the method comprising:

setting up an interrupt handler to execute at a first privilege level on the processor;

executing an application program comprising a plurality of instructions at a second privilege level other than the first privilege level on the processor, wherein executing the instructions of the application program comprises:

storing a stack pointer contained in the stack pointer register to a memory;

restoring the stack pointer from the memory to the stack pointer register; and between the steps of storing and restoring the stack pointer, performing one or more operations for storing data other than the stack pointer in the stack pointer register, the operations excluding any stack operations;

whereby on receiving an interrupt in executing the application program between the steps of storing and restoring the stack pointer, the processor switches to the first privilege level and stores a return address of the application program on the stack allocated to the first privilege level, the method thereby avoiding corruption of the stack allocated to the second privilege level when the stack pointer register stores data other than the stack pointer and an interrupt occurs.

\* \* \* \* \*